A. J. MATTHEWS.
Animal Traps.
No. 139,800.　　　　　　　　　Patented June 10, 1873.
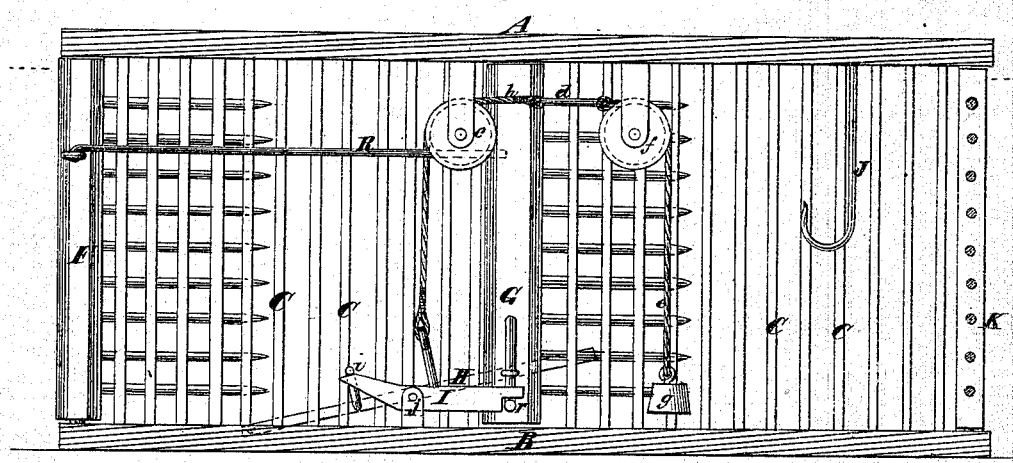
Fig: 1
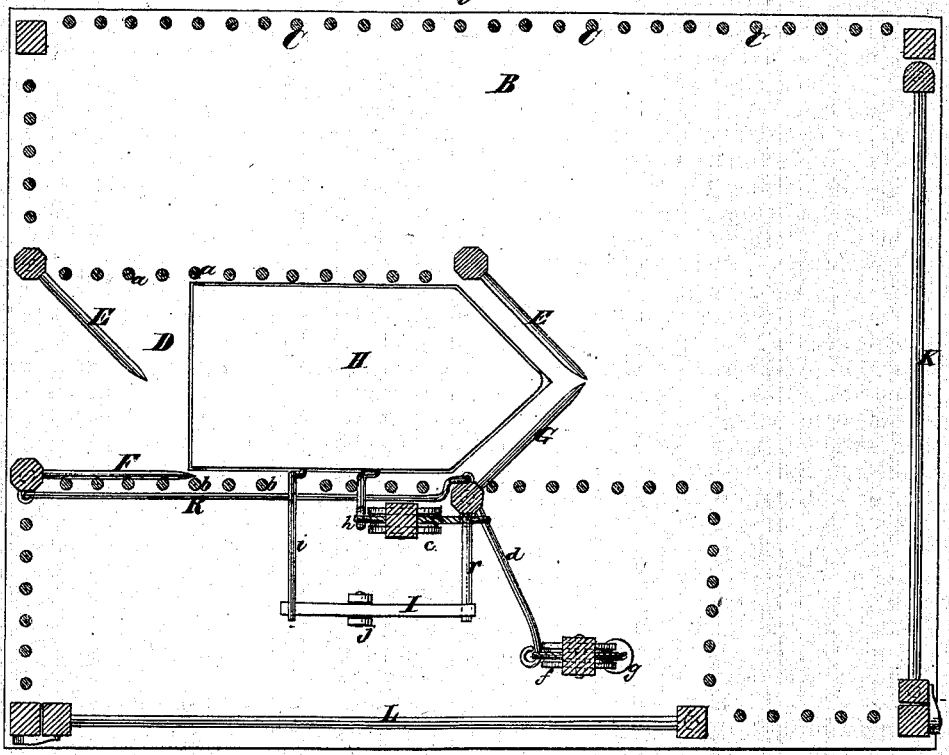
Fig: 2
Witnesses:

UNITED STATES PATENT OFFICE.

ADONIRAM J. MATTHEWS, OF HARTWELL, GEORGIA.

IMPROVEMENT IN ANIMAL-TRAPS.

Specification forming part of Letters Patent No. 139,800, dated June 10, 1873; application filed May 3, 1873.

*To all whom it may concern:*

Be it known that I, ADONIRAM J. MATTHEWS, of Hartwell, in the county of Hart and State of Georgia, have invented an Animal-Trap, of which the following is a specification:

This invention consists in the combination of a rising and falling platform, a counterbalance for retaining it in a raised position, and swinging gates arranged at the ends of an entrance-compartment containing the said platform whereby an animal entering the compartment is permitted to pass into the body of the trap, and is then shut off from said compartment and prevented from escaping. It also consists in the combination with a rod on the gate at the rear end of the aforesaid compartment, of a notched lever, and rod or arm on the platform whereby said gate is locked in a closed position.

In the accompanying drawing, Figure 1 is a longitudinal section of a trap constructed according to my invention; and Fig. 2 is a horizontal section of the same.

Similar letters of reference indicate corresponding parts in both figures.

The trap represented has a wooden top, A, and a wooden bottom, B, and its sides are composed of wire bars C C. D is the entrance-compartment, which is arranged at one end of the trap and is separated from the main body of the trap by two rows of wires *a a* and *b b*. At each end of the row *a a* there is a stationary gate or projecting horizontal series of wires, E, and at the forward end of the row *b b* there is a swinging gate, F, and near the rear end there is another swinging gate, G. Both of these gates, F and G, shut against the stationary gates or horizontal series of bars E E, and the inner side of the post of the latter gate is connected with the outer side of the post of the former gate by a rod R. H is the rising-and-falling platform, which is arranged in a recess in the bottom B, within the entrance-compartment D, occupying its whole width, and is hinged at its forward end within the said recess; and its rear end is connected with the outer side of the post of the gate G by means of a cord, *h*, passing over a pulley, *c*. A rod, *d*, projecting from the same side of the gate-post has attached to it a cord, *e*, which passes over a pulley, *f*, and has a weight, *g*, suspended from its free end. This weight by its gravity turns the post of the gate G and closes the gate, and, by winding the cord *h* upon the aforesaid gate-post, raises the rear end of the platform and retains it in a raised position when there is no animal upon it. On the side of the platform adjacent to the swinging gates there is a rod, *i*, which, in the falling or depression of the platform by the weight of an animal upon it, acts on one arm of a lever, I, supported in a fulcrum, *j*, and depresses it. The end of the other arm of this lever is notched, and when the platform is in its normal raised position fits over an arm or rod, *i*, provided on the post of the gate G, and locks the gate and prevents an animal behind it in the body of the trap from pulling it open. The bait-hook J is arranged in rear of the gate G, and in the back or rear end of the trap there is a door, K, which is secured closed by a button, and through which the trap is baited, and the animals caught allowed to escape. The part of the trap containing the counter-balance and the rest of the operating-mechanism is shut off from the rest of the trap, and a door, L, is provided opposite it.

The trap is baited in the usual manner, and the counter-balance keeps the platform H raised and forward gate F open, and the rear gate G closed. An animal entering the compartment D goes onto the platform H, and by its weight depresses the former and so closes the front gate F behind him, and raises the notched arm of the lever I, and releases the rod *r* on the gate G, and also opens the latter, and permits the animal to pass into the body of the trap. The counter-balance then raises the platform and thereby opens the front gate and closes the rear gate, and by freeing the lever I permits the notched end to drop over the rod $r$ on the gate G, and lock the latter, and so prevent it from being pulled open by an animal behind it.

I claim—

1. The rising-and-falling platform H, counter-balance $g$, the swinging gates F and G, in combination with the stationary gates E E and passage-way D, all arranged substantially as described, and for the purpose set forth.

2. The combination of the rod or arm $i$ on the platform H with the lever I, notched at one end, and the rod $r$ on the post of the gate G, substantially as and for the purpose specified.

ADONIRAM J. MATTHEWS.

Witnesses:
JOHN H. SKELTON,
WM. MYERS.